T. DOBLE.

ROPE HALTER.

No. 11,586. Reissued Jan. 26, 1897.

Attest
Wm. J. Hall
Walter Vandersen

Inventor
Thomas Doble
by F. L. Middleton
Atty

THE NORRIS PETERS CO., PHOTO-LITHO., WASHINGTON, D. C.

UNITED STATES PATENT OFFICE.

THOMAS DOBLE, OF BINGHAMTON, NEW YORK, ASSIGNOR OF ONE-HALF TO J. MONROE LYONS, OF SAME PLACE.

ROPE HALTER.

SPECIFICATION forming part of Reissued Letters Patent No. 11,586, dated January 26, 1897.

Original No. 522,408, dated July 3, 1894. Application for reissue filed October 26, 1894. Serial No. 535,575.

*To all whom it may concern:*

Be it known that I, THOMAS DOBLE, a citizen of the United States, residing at Binghamton, Broome county, New York, have invented a new and useful Improvement in Halters, of which the following is a specification.

My invention relates to halters, and while shown as applied to a rope halter I desire it understood that it may be used in connection with leather halters and that a part of my invention relating particularly to the clamping-ring may be used in many other situations.

My invention is shown in the accompanying drawings, in which—

Figure 1:
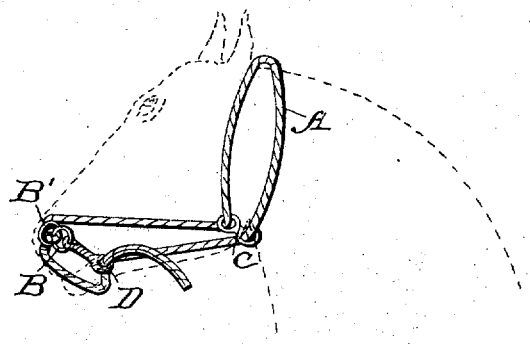
Figure 2:
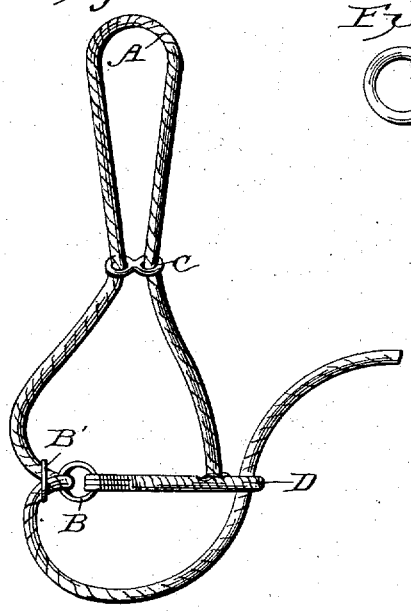
Figure 4:
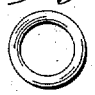
Figure 3:
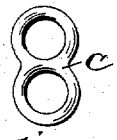
Figure 5:
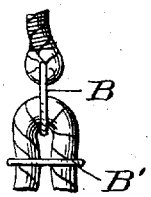

Figure 1 illustrates the halter as applied. Fig. 2 is a detached view of the halter, and Figs. 3, 4, and 5 represent details of the various parts.

In the figures the halter is shown as composed of a single piece of rope, a loop A being formed adapted to encircle the neck of the animal by the use of a double ring C, through which the ends of the rope are passed, as shown in Fig. 1, and this ring may be adjusted to enlarge or diminish the size of the loop A.

The halter has a ring B secured in any suitable manner to one end, and intermediate of this end and the ring C is a loop or eye D, formed in the rope itself for a purpose hereinafter described. A loose ring is arranged upon the opposite limb of the halter, and this is intended to lock this end of the halter as it is doubled upon itself after first passing it through the ring B. This loose ring B′ is slipped down after the proper adjustment is made, as shown in Fig. 5, and binds the double portion of the rope against the ring B, and thus securely holds the rope in place at this point, and no amount of strain upon the free end of the rope will loosen this grip, but instead tends to tighten it. The free end of the rope is passed through the loop D after passing over the nose of the animal, as shown in Fig. 1, and this free end may be then used to attach the animal to the stall or post or any other fixed point.

It will be understood that the form of lock consisting of two rings, one encircling the strand of the rope and the other encircling a double portion of said rope at the point where it passes through the first ring, may be used in many other places where such a lock is desirable.

I claim—

1. A halter comprising a loop A, a ring B at the end of one limb of the rope, the loop or eye D intermediate of the terminal ring B and the loop A, the other limb of the rope passing through the terminal ring B and through the intermediate loop D, substantially as described.

2. A halter comprising a loop A, a ring B at the end of one limb of the rope, the loop D intermediate of the terminal ring and the loop A, the other limb of the rope passing through the ring B and the loop D, the movable ring C for adjusting the loop A and the movable locking-ring B′ to act in conjunction with the ring B, substantially as described.

3. In combination, a rope or strap, a ring upon one end thereof, and a second single ring loose upon the rope or strap, said single ring having its interior diameter smaller than the exterior of the first ring and being arranged at right angles to the first ring and centrally thereof and bearing against the outer periphery of said first ring, the rope or strap passing through the loose ring to one side of the terminal ring, through the terminal ring and again through the loose ring upon the opposite side, substantially as described.

THOMAS DOBLE.

Witnesses:
ALMIRON M. SPERRY,
CHARLES K. HUBBELL.